United States Patent
Sevtsenko et al.

(10) Patent No.: US 8,677,157 B1
(45) Date of Patent: Mar. 18, 2014

(54) SYSTEMS AND METHODS FOR DETECTING POWER CONSUMPTION OF A COMPUTING DEVICE

(75) Inventors: Mihhail Sevtsenko, Harjumaa (EE); Konstantin Manuilov, Tallinn (EE)

(73) Assignee: Symantec Corporation, Mountain View, CA (US)

( * ) Notice: Subject to any disclaimer, the term of this patent is extended or adjusted under 35 U.S.C. 154(b) by 473 days.

(21) Appl. No.: 12/981,826

(22) Filed: Dec. 30, 2010

(51) Int. Cl.
*G06F 1/00* (2006.01)

(52) U.S. Cl.
USPC .......................................................... 713/300

(58) Field of Classification Search
USPC .......................................................... 713/340
See application file for complete search history.

(56) References Cited

U.S. PATENT DOCUMENTS

| | | | | |
|---|---|---|---|---|
| 7,343,276 B1 * | 3/2008 | Tsukamoto et al. | ............. | 703/18 |
| 8,145,918 B2 * | 3/2012 | Borghetti et al. | ............. | 713/300 |
| 8,316,254 B2 * | 11/2012 | Kaneko et al. | ................ | 713/323 |

* cited by examiner

*Primary Examiner* — Kim Huynh
*Assistant Examiner* — Eric Chang
(74) *Attorney, Agent, or Firm* — Holland & Hart LLP

(57) ABSTRACT

A computer-implemented method to detect power consumption of a computing device is described. At least one component of the computing device is identified to monitor. A state of the identified component is determined. A database is accessed to determine a power consumption rate of the identified component. The power consumption rate is based on the determined state of the component. An overall power consumption value of the computing device is calculated based on a power consumption rate for each monitored component of the computing device.

20 Claims, 7 Drawing Sheets

SYSTEMS AND METHODS FOR DETECTING POWER CONSUMPTION OF A COMPUTING DEVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone who uses and relies on computers.

Computers require power to operate. Administrators of multiple computing systems may be required to monitor the power consumption of each system. If a network of systems is large, this may require a substantial amount of time and resources for the administrator to properly monitor and determine power usage of each system in the network. Sensors or other types of hardware may be installed in each computing system to determine the power consumption of their respective devices. This, however, may require resources to install this hardware on each computing system. As a result, benefits may be realized by providing system and methods indirectly monitor the power consumption of a computing device.

SUMMARY

According to at least one embodiment, a computer-implemented method to detect power consumption of a computing device is described. At least one component of the computing device is identified to monitor. A state of the identified component is determined. A database is accessed to determine a power consumption rate of the identified component. The power consumption rate is based on the determined state of the component. An overall power consumption value of the computing device is calculated based on a power consumption rate for each monitored component of the computing device.

In one embodiment, the monitored component may be a hardware device of the computing device. The monitored component may be software installed on the computing device. The computing device may be a remote computing device.

In one configuration, out-of-band protocols may be used to calculate the overall power consumption value. The database may store a power consumption range for each identified component. In one example, the component may be at least one of the following: a processor, a monitor, a hard drive, a power supply unit, a chip set, a video card, a universal serial bus (USB) device, or a USB port. Information may be stored in the database regarding at least one component included in the computing device. The information may include a range of power consumption for the at least one component.

A computing device configured to detect power consumption of a remote computing device is also described. The computing device may include a processor and memory in electronic communication with the processor. The computing device may also include a power consumption monitoring module configured to identify at least one component of the computing device to monitor, and determine a state of the identified component. The power consumption monitoring module may also be configured to access a database to determine a power consumption rate of the identified component. The power consumption rate may be based on the determined state of the component. The power consumption monitoring module may be further configured to calculate an overall power consumption value of the computing device based on a power consumption rate for each monitored component of the computing device.

A computer-program product for detecting power consumption of a computing device is also described. The computer-program product may include a computer-readable medium having instructions thereon. The instructions may include code programmed to identify at least one component of the computing device to monitor, and code programmed to determine a state of the identified component. The instructions may also include code programmed to access a database to determine a power consumption rate of the identified component. The power consumption rate may be based on the determined state of the component. The instructions may further include code programmed to calculate an overall power consumption value of the computing device based on a power consumption rate for each monitored component of the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
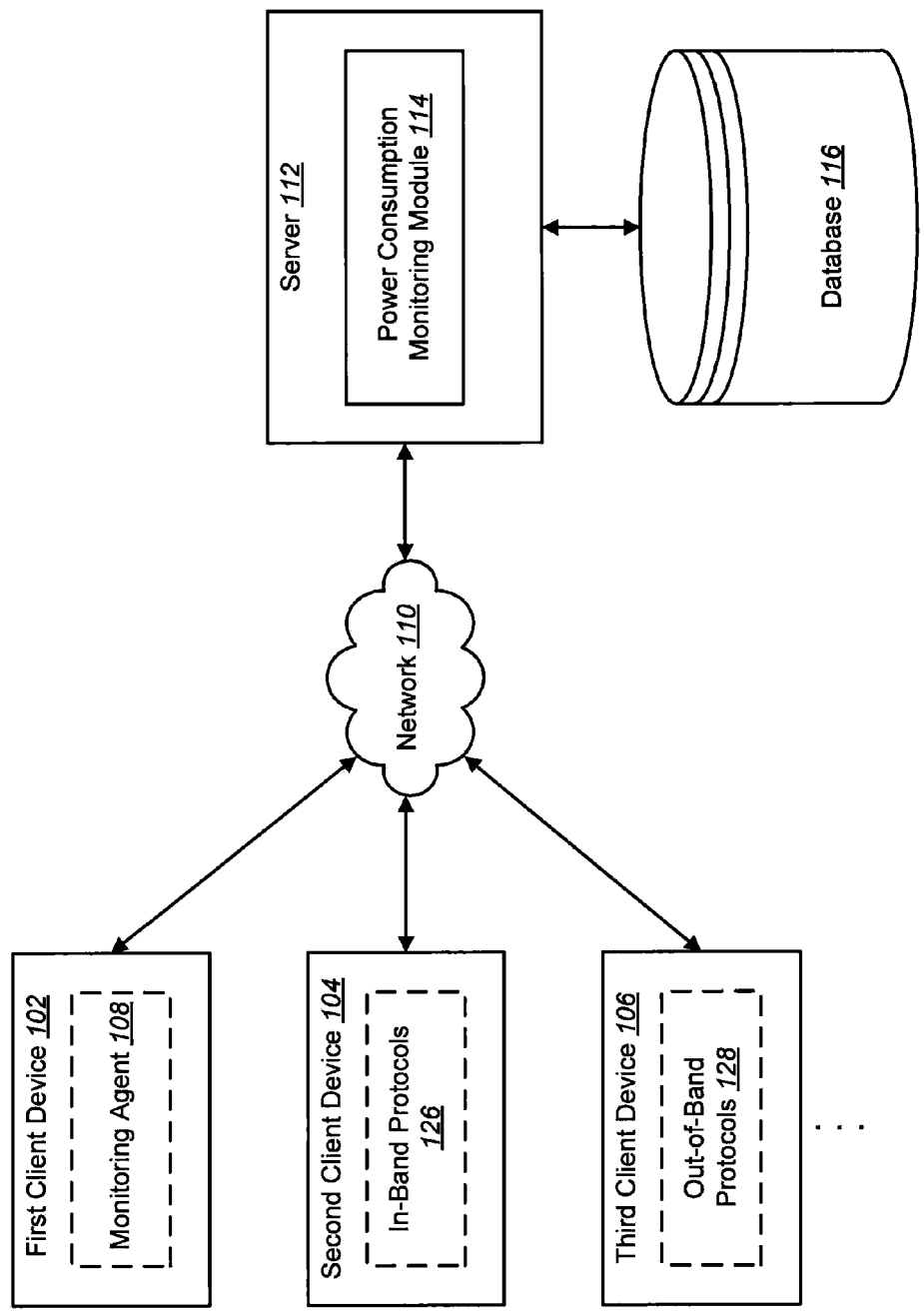
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Many electronic devices implement a type of power management. For example, computer monitors may automatically power down or switch to a low-power consumption state when the computer is inactive for a certain period of time. Power management features for computing systems may be desired for several reasons. For example, power management features may reduce the overall energy consumption, prolong the battery life for portable and embedded systems, reduce cooling requirements, reduce noise, reduce operating costs for energy and cooling, etc. Lower power consumption may also imply lower heat dissipation, which may result in an increase of system stability and a decrease in energy usage. This may lead to lower operating costs and a reduced impact on the environment.

In one embodiment, a computing device may enter a hibernation state when the device is idle for a certain period of time. When a computing device hibernates it may save the contents of the read-access memory (RAM) to disk and then power down the device. On startup, the device may reload the data from disk. This may allow the device to be completely powered off while in the hibernation state.

Effective power consumption techniques and power savings plan may play a substantial role in calculating total cost of ownership of hardware components. High energy usage costs for inefficient hardware and the need to cool the air around such hardware may require a versatile approach. For example, efficient hardware may save power as well as efficient use of software. Currently, owners of a large set of computing devices may not be aware of specific power consumption details of the hardware because the hardware may not be equipped with sensors. Alternatively, owners of these computing devices may not know the power consumption details because power metering hardware may not be integrated into the power sockets that provide power to the computing devices.

In one configuration, the present systems and methods may determine the total power consumption of computing devices by enumerating the hardware components included in the devices. The enumeration may be accomplished by acquiring the power consumption of separate hardware components in each computing device. The power consumption details of each component may be obtained from, for example, device specifications, an empiric value based on device characteristics such as, but not limited to, speed, voltage, etc. In one example, the present systems and methods may calculate the total power consumption of each computing device as a sum of the separate power consumption values of each component.

The present systems and methods may also monitor the current, immediate power consumption of a computing device. To perform this monitoring, the present systems and methods may use information from operating system (OS) performance counters or other software agents. For example, if the OS and the hard drive are idle, the present systems and methods may determine that the hard drive is consuming power at its lowest declared value. Further, if a processor is not loaded, the amount of power being consumed may be at the lower end of its power consumption range. In addition, the present systems and methods may use out-of-band protocols to measure the power consumption of a computing device in a hibernation state even when the OS is not functional (the nature of out-of-band protocols may provide the present systems and methods with the ability to enumerate components of a device without a functional OS). In one example, a computing device in a hibernation state may continue to consume power in order to keep data in RAM. In addition, the computing device in the hibernation state may consume power for other components such as, but not limited to, a network card. The present systems and methods may calculate the power consumption of such a device.

FIG. 1 is a block diagram illustrating one embodiment of an environment in which the present systems and methods may be implemented. In one configuration, a server 112 may communicate with at least one client device 102, 104, 106. The client devices 102, 104, 106 may communicate with the server 112 across a network 110. The network 110 may include a wide area network (WAN), a local area network (LAN), a wireless local area network (WLAN), and the like. The server 112 may include a power consumption monitoring module 114 that may monitor the power consumption of each client device 102, 104, 106. In one embodiment, the server 112 may include or communicate with a database 116. The database 116 may store data regarding the power consumption of individual components of each client device 102, 104, 106. For example, the database 116 may store a record for the first client device 102 that includes each hardware components included in the first client device 102. The record may indicate a range of power consumption for each hardware component. The power consumption monitoring module 114 may calculate the total power consumption of the first client device 102 by determining a power consumption value of each component of the first client device 102 and obtaining the total value by summing power consumption value of each component. The database 116 may store a power In one configuration, a first client device 102 may include a monitoring agent 108. The agent 108 may perform the calculations to determine the total power consumption of the first client device 102. A second client device 104 may include in-band protocols 126 that may be used to monitor various components of the second client device 104 when the components are available, online, active, etc. A third client device 106 may include out-of-band protocols 128 that may be used to monitor various components of the third client device 106 when the components are in a hibernation state, inactive, offline, powered down, etc. As a result, the power consumption of the client devices 102, 104, 106 may be monitored regardless of the state of the components of the devices. The monitoring agent 108, in-band protocols 126, and out-of-band protocols 128 may be used on one or more of the client devices 102, 104, 106.

Figure 2:
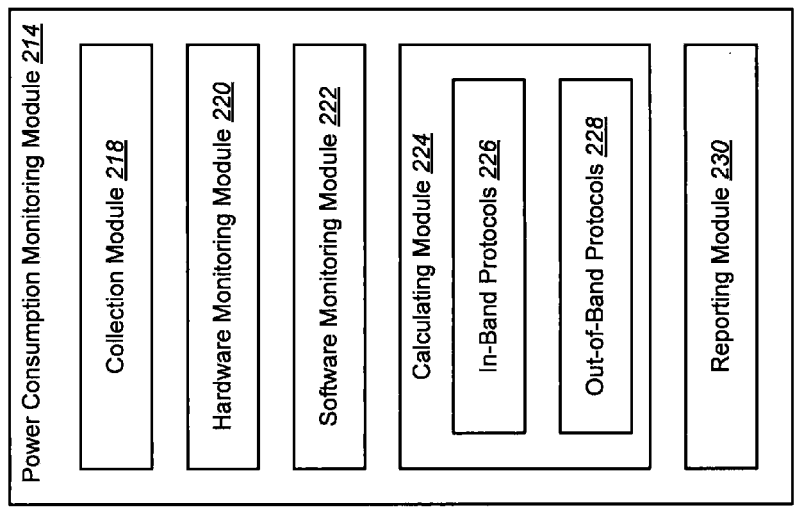
FIG. 2 is a block diagram illustrating one embodiment of a power consumption monitoring module in accordance with the present systems and methods.

FIG. 2 is a block diagram illustrating one embodiment of a power consumption monitoring module 214 in accordance with the present systems and methods. The power consumption monitoring module 214 may be located on a server 112 that is in communications with one or more remote client devices 102, 104, 106. In one example, the monitoring module 214 may include a collection module 218, a hardware monitoring module 220, a software monitoring module 222, a calculating module 224, and a reporting module 230. The power consumption monitoring module 214 may measure and monitor the power consumption of remote client devices. In one configuration the module 214 may use remote management protocols to monitor the remote client devices. Examples of these remote management protocols may include, but are not limited to Windows Management Instrumentation (WMI), Simple Network Management Protocol (SNMP), and the like.

The collection module 218 may perform a hardware and/or software inventory of a remote client device. In other words, the collection module 218 may automatically collect information about the various hardware components and software installed on a particular client device. Current systems may rely on a user to manually input data regarding the hardware components and software operating on a computing device. For example, the user may be required to input this data using a hardware metering device installed on the computing device. In contrast, the present systems and methods may automatically detect hardware devices and software installed on the remote client device.

In one embodiment, the hardware monitoring module 220 may monitor the hardware devices detected on the remote client device by the collection module 218. In one configuration, the component may be a processor, monitor, hard drive, power supply unit, chip set, video card, a universal serial bus (USB) device, a USB port, and the like. The hardware monitoring module 220 may access a database 116 of hardware devices that stores information regarding the power consumption ranges of each of these devices. The hardware monitoring module 220 may rely on the information stored in the database 116 to assist in determining the overall power consumption of the client device automatically, without hardware tools, sensors, or meters that monitor power consumption.

The software monitoring module 222 may monitor the software detected on the remote client device by the collection module 218. The software monitoring module 222 may access a database 116 that stores information regarding the power consumption ranges of various types of software. The software monitoring module 222 may rely on the information stored in the database 116 to assist in determining the overall power consumption of the client device automatically, without hardware tools, sensors, or meters that monitor power consumption.

In one configuration, the calculating module 224 may calculate the current power consumption or potential power consumption of a remote client device. The calculating module 224 may use information gathered from the hardware monitoring module 220 and the software monitoring module 222 to calculate the power consumption of the client device. In one configuration, the calculating module 224 may include in-band protocols 226 and out-of-band protocols 228. The in-band protocols 226 may be used when the monitored hardware and software are currently available, online, active, loaded, etc. The out-of-band protocols 228 may be used to monitor hardware and software components that may be in a hibernation state, offline, inactive, etc. As a result, the hardware inventory of a remote client device may be completed using out-of-band protocols 228 and the power consumption of the client device may be determined even if the device is in a sleep state or powered off. In one example, client devices that are in a hibernation state or even powered off may continue to consume a certain amount of energy.

The reporting module 230 may generate a power consumption report. The report may indicate the current power consumption or potential power consumption of a particular client device. The report may be transmitted to a computing device accessed by an administrator or other personnel monitoring the client device.

Figure 3:
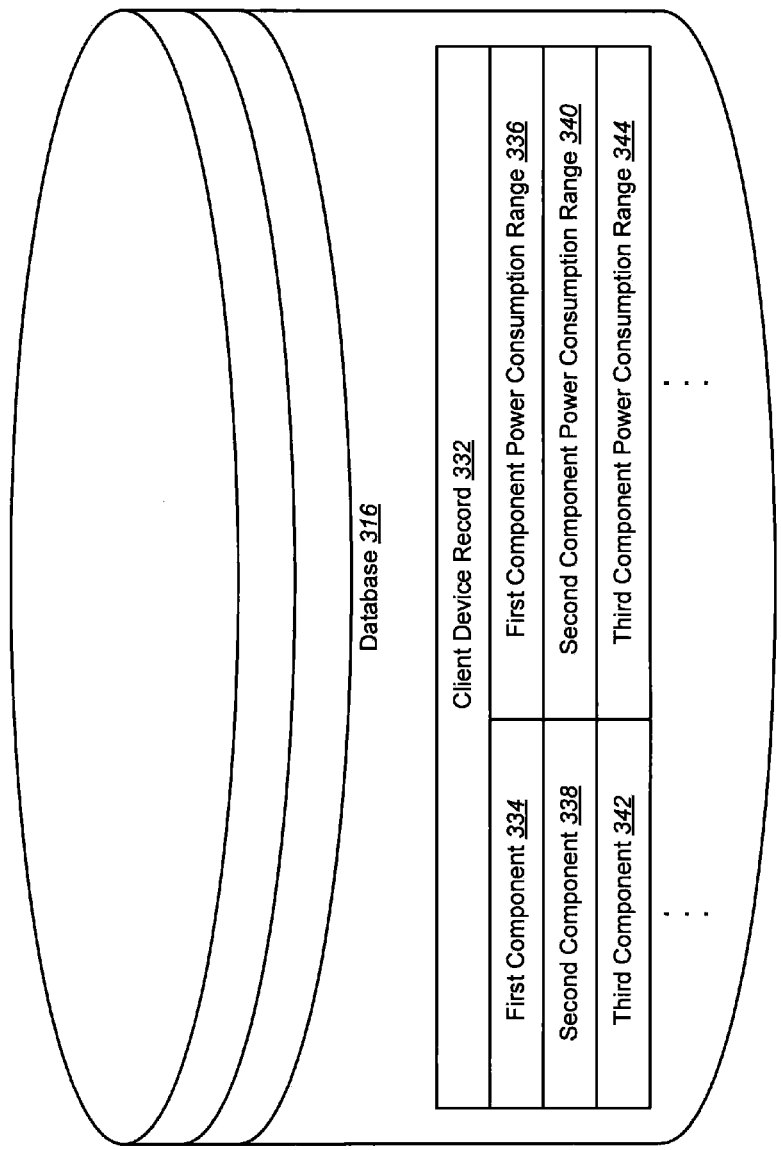
FIG. 3 is a block diagram illustrating one embodiment of a database in accordance with the present systems and methods.

FIG. 3 is a block diagram illustrating one embodiment of a database 316 in accordance with the present systems and methods. The database 316 may include at least one client device record 332. While the database 316 only includes one client device record 332, it is to be understood that the database 316 may store more than one client device record.

In one embodiment, the client device record 332 may include a data entry of a first component 334, a second component 338, and a third component 342. The record 332 may include more or less than three data entries of components. Each component data entry 334, 338, 342 may be associated with a data entry that indicates a power consumption range 336, 340, 344. For example, a first component 334 data entry may be for a processor of a remote client device. A first component power consumption range 336 data entry may be associated with the first component 334 data entry. In one configuration, the first component power consumption range 336 data entry may provide a range of energy consumed by the processor. For example, the range 336 may provide a minimum and maximum amount of power that may be consumed by the processor of the remote client device.

The power consumption monitoring module 114 may monitor the processor of the remote client device and determine the approximate amount of energy being consumed by the processor based on the current state of the processor (e.g., hibernation state, active state, etc.) as well as the current load on the processor. The monitoring module 114 may determine the approximate amount of energy being consumed by each component in the remote device using the data entries in the database 316. In one example, the monitoring module 114 may determine an overall power consumption of the remote client device by combining the power consumption values determined for each component. As a result, the power consumption monitoring module 114 may automatically determine the approximate power consumption of a particular remote client device by enumerating each component of the device.

Figure 4:
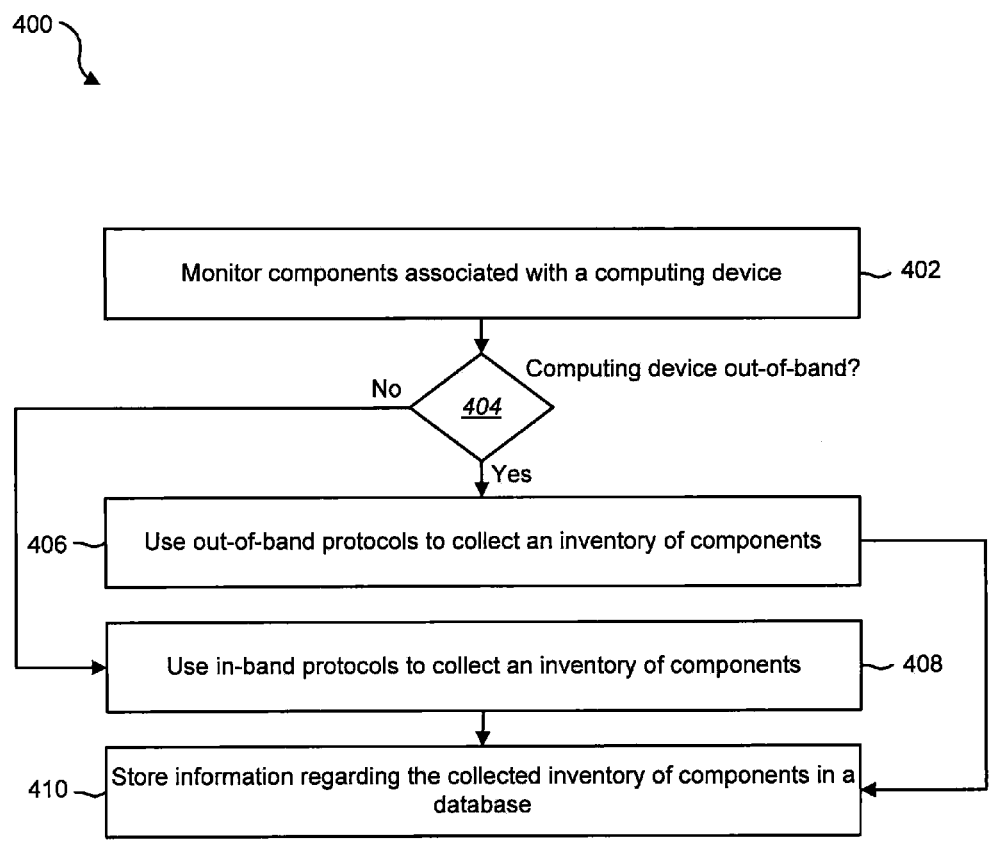
FIG. 4 is a flow diagram illustrating one embodiment of a method to generate a database that includes power consumption information for various components in a remote computing device.

FIG. 4 is a flow diagram illustrating one embodiment of a method 400 to generate a database 116 that includes power consumption information for various components in a remote computing device. In one configuration, the method 400 may be implemented by the power consumption monitoring module 114.

In one example, components associated with a computing device may be monitored 402. A determination 404 may be made as to whether the computing device is out-of-band. For example, a determination 404 may be made as to whether the computing device is in a hibernation state, powered down, etc. If it is determined 404 that the computing device is out-of-band, specific protocols may be used 406 to collect an inventory of components. For example, out-of-band protocols may be used 406. If, however, it is determined 404 that the computing device is not out-of-band, in-band protocols may be used 408 to collect an inventory of components in the computing device. In one configuration, the collected inventory of components may include hardware and/or software included in the computing device. In one example, information regarding the collected inventory of components may be stored 410 in a database. For example technical specifications for each component may be collected and stored 410 in the database. The technical specifications may indicate a power consumption range of each component.

Figure 5:
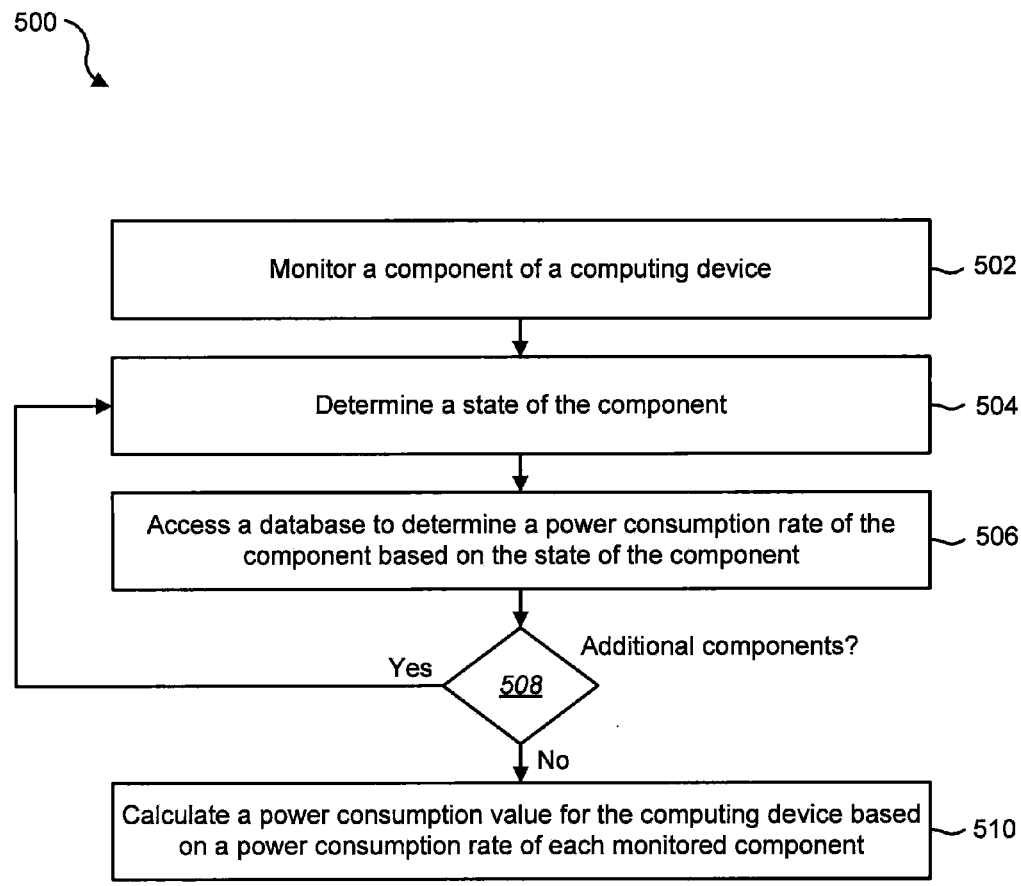
FIG. 5 is a flow diagram illustrating one embodiment of a method for detecting power consumption of a remote computing device.

FIG. 5 is a flow diagram illustrating one embodiment of a method 500 for detecting power consumption of a remote computing device. The method 500 may be implemented by the power consumption monitoring module 114. In another embodiment the method 500 may be implemented by a monitoring agent 108 installed on the remote computing device.

In one example, a component of the computing device may be monitored 502. A state of the component may be determined 504. For example, it may be determined whether the component is in a hibernation state, sleep state, powered down state, active state, powered on state, etc. A database may be accessed 506 to determine a power consumption rate of the component based on the determined state of the component. For example, the power consumption rate of a first component that is in a hibernation state may be lower than the power consumption rate of an active component. A determination 508 may be made as to whether additional components exist in the remote computing device. If it is determined 508 that additional components exist, a state of the additional component may be determined 504 and the method 500 may repeat. If, however, it is determined 508 that no more additional components exist on the computing device, a power consumption value for the computing device may be calculated 510. In one configuration, the power consumption value may be calculated 510 using out-of-band protocols or in-band protocols depending on the determined state of the components. In addition, the power consumption value may be calculated 510 based on the power consumption rate determined for each monitored component. The power consumption value may represent the total power consumed by the remote computing device or the immediate consumption rate of the device. As a result, the present systems and methods may indirectly detect power consumption of a remote device as well as meter immediate energy usage of the remote computing device.

Figure 6:
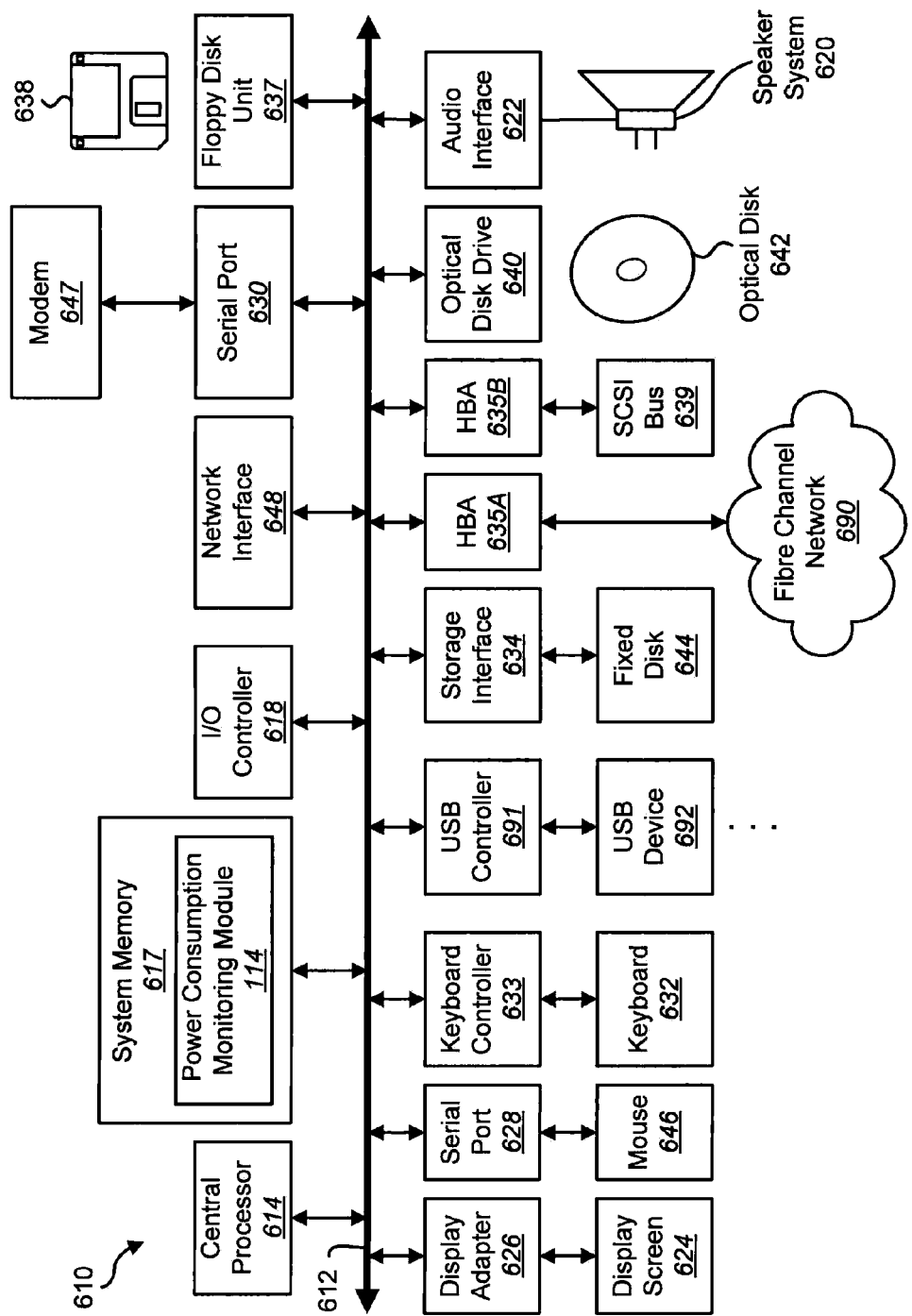
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), multiple USB devices 692 (interfaced with a USB controller 690), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the sequence recognizing module 104 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable medium such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
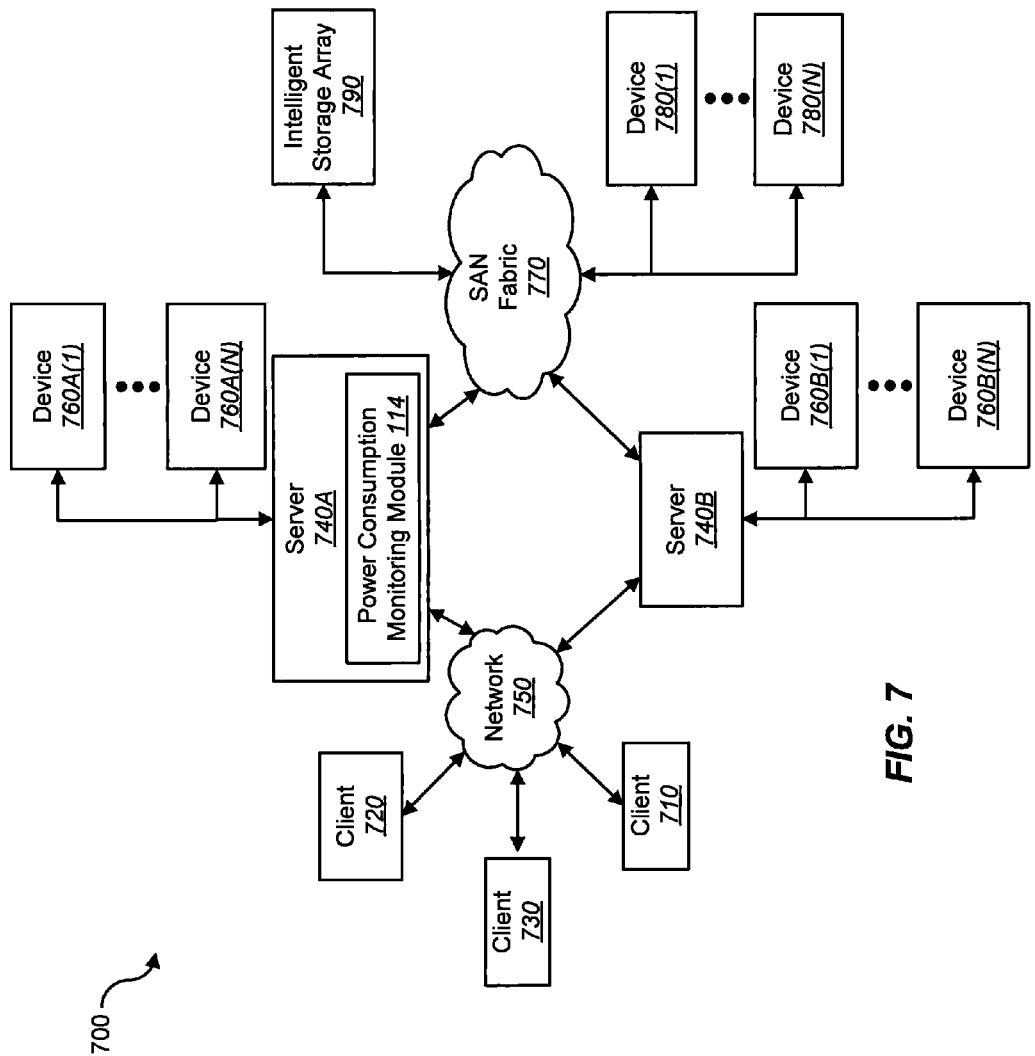
FIG. 7 is a block diagram depicting a network architecture in which client systems, as well as storage servers (any of which can be implemented using computer system), are coupled to a network.

FIG. 7 is a block diagram depicting a network architecture 700 in which client systems 710, 720 and 730, as well as storage servers 740A and 740B (any of which can be implemented using computer system 710), are coupled to a network 750. In one embodiment, the sequence recognizing module 104 may be located within a server 740A, 740B to implement the present systems and methods. The storage server 740A is further depicted as having storage devices 760A(1)-(N) directly attached, and storage server 740B is depicted with storage devices 760B(1)-(N) directly attached. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720, and 730 to network 750. Client systems 710, 720, and 730 are able to access information on storage server 740A or 740B using, for example, a web browser or other client software (not shown). Such a client allows client systems 710, 720, and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to detect power consumption of a computing device, comprising:
    determining, by a processor, whether an operating system of the computing device is functional;
    identifying, by the processor, at least one component of the computing device to monitor based, at least in part, on the determination of whether the operating system is functional;
    determining, by the processor, a state of the identified component;
    accessing, by the processor, a database to determine a power consumption rate of the identified component, wherein the power consumption rate is based on the determined state of the component; and
    upon determining the operating system is not functional, calculating, by the processor, an overall power consumption value of the computing device based on a power consumption rate for each monitored component of the computing device and an out-of-band protocol of the operating system.

2. The method of claim 1, wherein the monitored component comprises a hardware device of the computing device.

3. The method of claim 1, wherein the monitored component comprises software installed on the computing device.

4. The method of claim 1, wherein the computing device is a remote computing device.

5. The method of claim 1, further comprising, upon determining the operating system is functional, calculating the overall power consumption value of the computing device based on the power consumption rate for each monitored component of the computing device and an in-band protocol of the operating system.

6. The method of claim 1, wherein the database stores a power consumption range for each identified component.

7. The method of claim 1, wherein the component comprises at least one of the following: a processor, a monitor, a hard drive, a power supply unit, a chip set, a video card, a universal serial bus (USB) device, or a USB port.

8. The method of claim 1, further comprising storing information in the database regarding at least one component included in the computing device.

9. The method of claim 8, wherein the information comprises a range of power consumption for the at least one component.

10. A computing device configured to detect power consumption of a remote computing device, comprising:
    a processor;
    memory in electronic communication with the processor;
    instructions stored in the memory, the instructions executable by the processor to:
        determine whether an operating system of the computing device is functional;
        identify at least one component of the computing device to monitor based on the determination of whether the operating system is functional;
        determine a state of the identified component;
        access a database to determine a power consumption rate of the identified component, wherein the power consumption rate is based on the determined state of the component; and
        upon determining the operating system is not functional, calculate an overall power consumption value of the computing device based on a power consumption rate for each monitored component of the computing device and an out-of-band protocol of the operating system.

11. The computing device of claim 10, wherein the monitored component comprises a hardware device of the computing device.

12. The computing device of claim 10, wherein the monitored component comprises software installed on the computing device.

13. The computing device of claim 10, wherein, upon determining the operating system is functional, instructions are executable by the processor to:

calculate the overall power consumption value of the computing device based on the power consumption rate for each monitored component of the computing device and an in-band protocol of the operating system.

14. The computing device of claim 10, wherein the database stores a power consumption range for each identified component.

15. The computing device of claim 10, wherein the component comprises at least one of the following: a processor, a monitor, a hard drive, a power supply unit, a chip set, a video card, a universal serial bus (USB) device, or a USB port.

16. The computing device of claim 10, wherein the instructions are executable by the processor to:

store information in the database regarding at least one component included in the computing device.

17. The computing device of claim 16, wherein the information comprises a range of power consumption for the at least one component.

18. A computer-program product for detecting, by a processor, power consumption of a computing device, the computer-program product comprising a non-transitory computer-readable medium storing instructions thereon, the instructions being executable by the processor to :

determine whether an operating system of the computing device is functional;

identify at least one component of the computing device to monitor based on the determination of whether the operating system is functional;

determine a state of the identified component;

access a database to determine a power consumption rate of the identified component, wherein the power consumption rate is based on the determined state of the component; and upon determining the operating system is not functional, calculate an overall power consumption value of the computing device based on a power consumption rate for each monitored component of the computing device and an out-of-band protocol of the operating system.

19. The computer-program product of claim 18, wherein the monitored component comprises a hardware device of the computing device.

20. The computer-program product of claim 19, wherein the monitored component comprises software installed on the computing device.

* * * * *